E. E. GOLD.
TRAPPED HEATING SYSTEM.
APPLICATION FILED JAN. 21, 1909.

1,007,939.

Patented Nov. 7, 1911.

2 SHEETS—SHEET 1.

WITNESSES:
Fred White
René Buine

INVENTOR
Edward E. Gold,
By Attorney
Arthur C. Fraser Uhna

E. E. GOLD.
TRAPPED HEATING SYSTEM.
APPLICATION FILED JAN. 21, 1909.

1,007,939.

Patented Nov. 7, 1911.
2 SHEETS—SHEET 2.

WITNESSES:
Fred White
René Bruine

INVENTOR:
Edward E. Gold,
By Attorneys.

UNITED STATES PATENT OFFICE.

EDWARD E. GOLD, OF NEW YORK, N. Y.

TRAPPED HEATING SYSTEM.

1,007,939.  Specification of Letters Patent.  Patented Nov. 7, 1911.

Original application filed November 17, 1908, Serial No. 463,109. Divided and this application filed January 21, 1909. Serial No. 473,576.

*To all whom it may concern:*

Be it known that I, EDWARD E. GOLD, a citizen of the United States, residing in the borough of Manhattan, city, county, and State of New York, have invented certain new and useful Improvements in and Relating to Trapped Heating Systems, of which the following is a specification.

My invention aims to provide an improvement in heating systems especially applicable to the heating of railway cars by steam or indirectly by hot water which is heated by steam.

A feature of advantage is the provision of a trap having all the advantages of the vertical trap now commonly in use in pressure systems, and which at the same time is cheaper, simpler, and less liable to be thrown out of order by clogging with ice or for any other reason. It is also better ventilated and more sensitive than previous styles of trap, so as to give a quicker and nicer regulation.

This application is a division of my previous application No. 463,109 filed November 17, 1908, and is based particularly on improvements applied or applicable to the discharge valve and adjacent parts.

Various other features of advantage are referred to in detail hereinafter.

The accompanying drawings illustrate embodiments of the invention.

Figure 1:
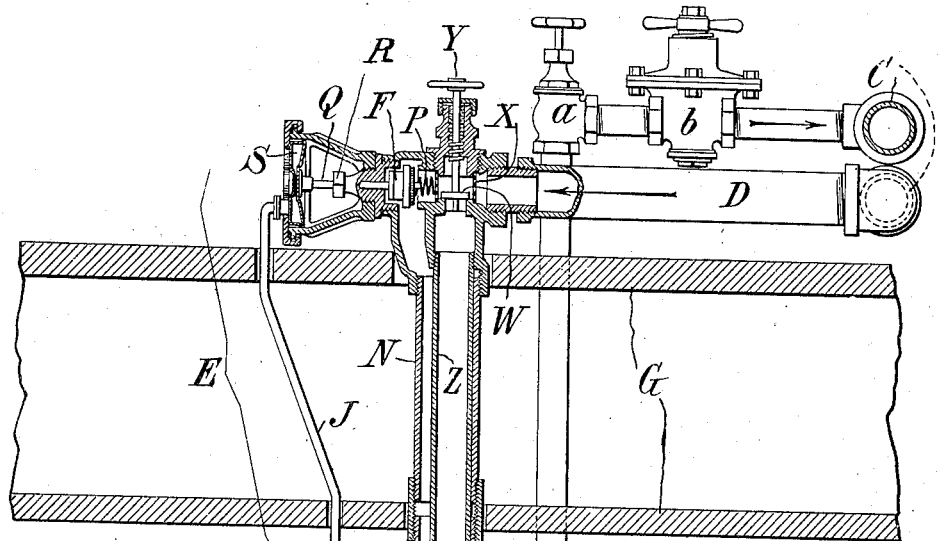
Figure 1:
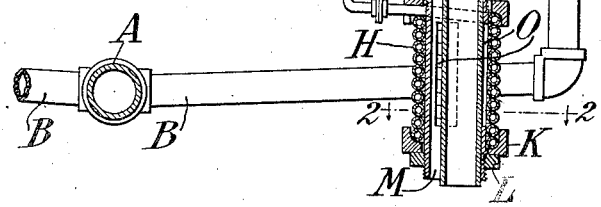
Figure 2:
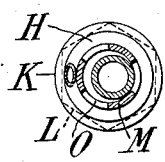
Figure 3:
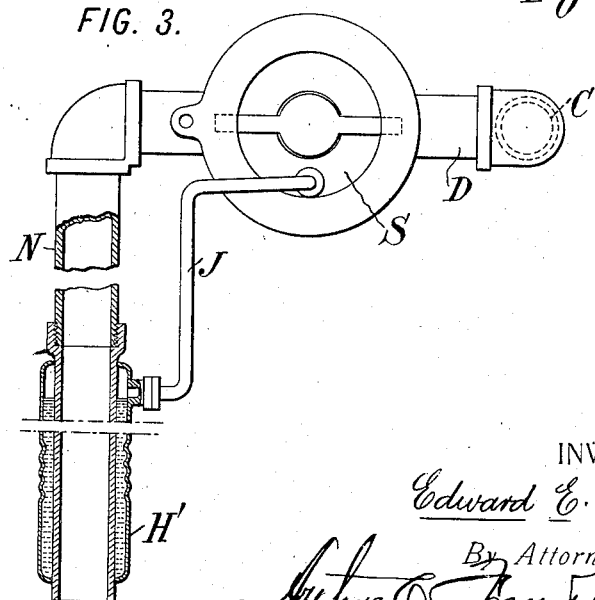
Figure 4:
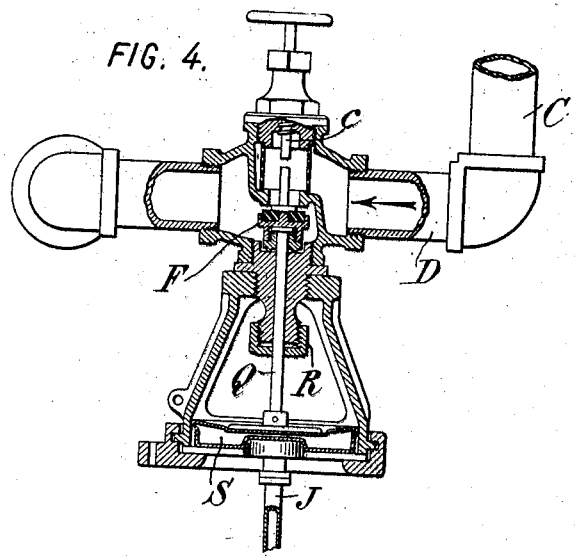
Figure 5:
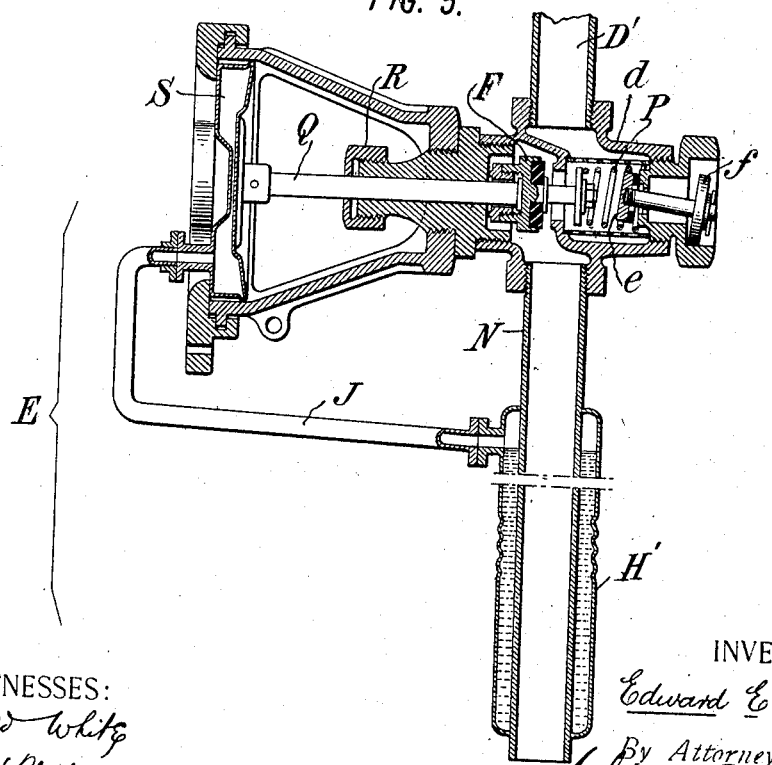

Figure 1 is a vertical sectional view of a discharge trap with the adjacent parts of the heating system in elevation. Fig. 2 is a cross-section on the line 2—2. Fig. 3 is an elevation of another style of trap. Fig. 4 is a horizontal section of the valve and adjacent parts of Fig. 3. Fig. 5 is a vertical section of the discharge end of another style of system.

Referring now to the embodiments of the invention illustrated, and especially to Fig. 1, the usual train-pipe A carrying a pressure of steam reduced from that in the locomotive boiler and varying from 40 to 80 pounds generally, extends the length of the car and is provided with suitable branches B leading to the radiating systems of the separate sides of the car. The radiating pipes are represented at C and the discharge pipe at D. The trap through which the water of condensation is allowed to escape is indicated as a whole by the letter E. It includes a valve F which, when the system is being operated as a pressure system, normally closes the discharge end of the pipe so as to prevent escape of steam and fall of pressure; and which opens at intervals when the water of condensation has accumulated in the discharge end of the pipe, so as to permit the escape of such water. Ordinarily this valve is arranged within the car and has a stem extending down through the double floor G of the car to an expansible vessel situated somewhat below the lower floor and which contains a thermostatic liquid such as alcohol, ether, or the like. Then when the valve is opened the water of condensation escapes and is followed by steam which is directed upon the expansible vessel and vaporizes the liquid therein and causes the vessel to expand and move the valve stem in a direction to close the valve and prevent the further escape of steam. When the valve has been closed for a time the temperature of the outer air to which the expansible vessel containing the thermostatic liquid is exposed effects the condensation of the thermostatic liquid and the contraction of the expansible vessel, and opens the valve. The exposure of the expansible vessel outside of the car introduces complications in order to protect it from injury and in order to prevent the protecting structure from causing it to become clogged with ice. Its position also is one in which it is not readily accessible. According to this invention these and other disadvantages are eliminated by transferring the expansible vessel which operates the trap valve to a point within the car where it is easily protected, entirely outside of the range of the escaping water of condensation so that there is no danger of freezing, and where it is perfectly accessible. At the same time the advantage is maintained of utilizing the escaping steam or hot water to expand the vessel, and of using the outside atmosphere to contract it. This is accomplished by providing a vessel outside the car and exposed to the escaping steam and to the outer atmosphere and containing the expansible fluid, and providing communication between the expansible fluid outside the car and the expansible vessel within the car.

Various styles of vessel may be used for carrying the expansible fluid and exposing it to the steam. Preferably the construction shown in Fig. 1 is employed, consisting of a cylindrical coil H of copper or brass tubing, the lower end of which is sealed and the upper end of which is continued in the pipe J which conveys the pressure to the valve-operating expansible vessel. The coil may be supported in any suitable way to provide access of the escaping steam to it. For example, it may be supported between cup-shaped washers K held in position by nuts L screwed upon the opposite ends of a core M forming a continuation of the vertical discharge pipe N, said core being provided with openings O for giving access of steam to the cylindrical coil. The nuts L may be adjusted so as to hold the convolutions of the coil in contact with each other and prevent the passage of steam or of air between them, or these nuts may set the coil with greater or smaller passages between the convolutions. The cold air is blowing on the coil at all times when the train is running, and the effect of separating the convolutions would be to expose the coil more extensively to the cooling action of the air and to render the system more sensitive to the coldness of the outer air. The use of a coil of pipe as the vessel for carrying the thermostatic fluid and exposing it to the heat and cold has great advantages, especially in that it expands and contracts freely and can be made free from joints except the single joint which connects it with the expansible vessel adjacent to the valve, in that it exposes a large surface to the steam at one side and to the air at the other side, and in that it can be readily and cheaply applied to traps or heating systems already in use. To permit the escape of air from the coil H while filling it, a small orifice is left at the lower end which when the necessary quantity of the thermostatic liquid is introduced is closed by a screw or other plug which is sufficiently tight to permit the coil to be soldered so as to close the opening hermetically.

It has always been a difficult matter to provide for the proper ventilation or exposure to the atmosphere of the vessel carrying the thermostatic liquid. In practically all the traps employed in car heating this vessel has been inclosed, and efforts have been made to secure as full an exposure to the atmosphere as possible. With the present system and especially with the coiled pipe serving as the vessel for carrying the thermostatic liquid, there is a perfect exposure to the atmosphere. This is of importance in determining the sensitiveness of the system. For theoretical perfection the system should operate so sensitively as to maintain as nearly as possible the same temperature at the discharge end of the radiator as at its admission end, thus getting the greatest efficiency out of the piping whose radiating surface is designed for a standard temperature. With a thermostat of the kind shown in Fig. 1, I have succeeded in securing, without appreciable waste of steam and working at atmospheric pressure, a temperature at the discharge end of the radiator approximately 12 per cent. greater (above zero Fahrenheit) than can be secured under the same conditions with the best traps of the type in which the thermostat is inclosed. As stated above, however, the vessel carrying the thermostatic fluid is capable of being varied in many ways. In the apparatus of Figs. 3 and 5 the expansible fluid (alcohol, ether, or the like) is carried in a vessel formed by a portion of the discharge pipe N of the valve, and by a jacket H' surrounding the same and brazed thereon. The jacket is provided with corrugations to allow a slight differential expansion between the jacket and the pipe without injury to the joints of the vessel, but as far as its effect upon the operation of the system is concerned it might be considered a substantially inexpansible vessel. The thermostatic fluid is in communication with the expansible vessel controlling the valve F, by means of a tube J.

The valve F is normally pressed open by a spring P. Its stem Q passes through a stuffing box R to the inner corrugated movable face of the expansible vessel S, the latter being held between a ring supported by a spider from the stuffing box or valve casing and an outer ring which locks by a bayonet joint or similar device over the inner ring. The construction is described more in detail and claimed in my original application above referred to.

It will be seen that the water of condensation passing through the trap valve F and down the discharge pipe N thereof finds a perfectly free outlet. As soon as the water of condensation has all passed out and the steam comes, it heats the thermostatic liquid and vaporizes it, creating a fluid pressure which is transmitted to the expansible vessel S and closes the valve. When the flow of steam has been stopped long enough, the outside temperature causes the condensation of the thermostatic liquid and the collapsing of the vessel S and the opening of the valve to release the water of condensation which has accumulated in the meantime.

It is desirable to provide a blow-off valve, and this is conveniently combined with the trap. The blow-off valve in Fig. 1 is indicated at W and is a simple hand valve surrounded by a screen X, and raised and lowered by means of a spindle Y. The discharge pipe Z for the blow-off is preferably arranged within or closely adjacent to the discharge of the trap, so that by opening the blow-off and allowing live steam to pass freely through the discharge pipe Z any ice in the adjacent discharge pipe N of the trap will be melted.

The mechanisms described may be arranged at the discharge end of various types of heating systems. In Fig. 1 the system is shown as provided with the usual hand admission valve *a* and with the pressure reducing admission valve *b* whereby the variable high pressure in the train-pipe may be reduced to a constant comparatively low pressure in the radiating pipes.

Figs. 3 and 4 show an arrangement of the discharge valve in a somewhat different location from that shown in Fig. 1. Means are also shown in Fig. 4 for holding the valve open by hand so that it may serve at once as a trap valve and as a blow-off valve. The vertical portion N of the discharge pipe in this case is entirely clear, so that there is less danger of clogging by freezing, and the elimination of a separate blow-off valve simplifies the construction. The valve F in this case is arranged to move horizontally, its stem Q being connected with the expansible vessel S which is connected by the communicating pipe J with the jacket H' below the floor of the car as previously described. The steam flowing in the direction of the arrow tends to open the valve when there is no pressure in the expansible vessel. When such pressure arises the valve closes. In order to use the valve as a blow-off, a stem *c* is passed through a stuffing box at the opposite side of the valve casing, and is arranged to screw in and out in line with the extended stem of the valve F, so that by screwing in the stem *c* the valve F may be forced open and held so against the fluid pressure in the expansible vessel, thus blowing out the pipes.

Besides the styles of vessel for thermostatic fluid shown in Figs. 1 and 3, various other styles may be employed. Examples of these are illustrated and described in detail in my original application above identified.

In my original application above referred to, and in previous applications for patents, I have described systems working always at train-pipe pressure or at a determined pressure reduced from that of the train-pipe by a special reducing valve, and other systems working always at approximately atmospheric pressure; and also systems which are interchangeable from the pressure of the train-pipe or that of a reducing valve to atmospheric pressure at will. Where the system is to work always at atmospheric pressure, the discharge end is normally open, and it is usual to dispense with a discharge valve. The valve of the present invention, with or without the pressure regulating admission valve *b* of Fig. 1, is applicable either to systems working constantly at pressure or to the interchangeable system above described.

It is not essential that the discharge valve be located within the car. The invention is equally applicable to systems in which both the valve and the thermostatic liquid are carried outside of the car. Fig. 5 for example illustrates an application of this invention to the style of discharge pipe usual with indirect systems. These are systems in which the circulation of steam is utilized to heat a body of water which circulates through the pipes which are directly used for heating the air in the car. The discharge pipe D' projecting below the floor of the car is provided with a discharge valve F similar to that of Fig. 1, and a pipe N with a jacket H' carrying the volatile liquid which is heated by the escaping steam, and creates a fluid pressure in the expansible vessel S which actuates the valve stem Q to close the valve against the pressure of the spring P. Preferably the valve casing *d* is apertured at the side opposite the valve F, and carries a gravity valve or air valve *e* which carries on the outer end of its arm a weight *f*. This is an old type of valve whose function is to admit air into the pipe as soon as the pressure falls to approximately atmospheric. While the pressure is maintained, the valve *e* is held against its seat, holding up the small weight *f*. As soon as the pressure falls the weight *f* drops and tilts the valve so as to admit air into the pipes and prevent the existence of a vacuum, which is objectionable, holding up water in the pipes and sometimes causing freezing.

The locating of the expansible vessel above the trap insures the thermostatic liquids flowing back into the vessel H (or H') after it has been expanded and is subsequently recondensed by the cooling of the vessel. Preferably as shown in Fig. 3 the liquid is supplied only in sufficient quantity to fill the vessel H leaving the passages and expansible vessel filled with air or vapor; so that it is only the comparatively small quantity of liquid in the lower vessel which has to be heated to the vaporizing point, the air previously in the pipe J and the upper vessel serving only to transmit the pressure and having no material effect on the temperature of the liquid.

What I claim is:—

1. In a heating system the combination of a discharge valve, an expansible vessel controlling said valve, and a second vessel containing a thermostatic fluid, said second vessel being in communication with said valve-controlling vessel and being located beyond said valve so that the thermostatic fluid therein will be heated by the heating medium which has passed through the valve, the valve-controlling vessel being within the compartment to be heated and the second vessel being exposed to the temperature of the atmosphere outside of said compartment.

2. In a heating system the combination of a discharge valve, an expansible vessel controlling said valve, means exposed to the surrounding atmosphere and to the escaping heating medium for thermostatically generating a fluid pressure, and means for introducing such pressure into said expansible vessel, said generating means being exposed to the atmosphere outside of the compartment to be heated and said expansible vessel being protected from said atmosphere.

3. In a heating system the combination of a discharge valve and thermostatic means for controlling said valve including a coil of pipe exposed on one side to the heat from the heating medium beyond said valve and upon the other side to the surrounding atmosphere and carrying a thermostatic fluid.

4. In a heating system the combination of a discharge valve and thermostatic means for controlling said valve including a cylindrical coil of pipe H carrying a thermostatic fluid and through the cylindrical center of which the heating medium passes.

5. In a heating system, the combination of a discharge valve, an expansible vessel within the apartment to be heated for controlling said valve, and means exposed to the discharge from the system and to the temperature outside of said apartment for generating fluid pressure, said pressure-generating means being in communication with said expansible vessel to introduce fluid pressure directly into said vessel to expand it.

6. In a car heating system the combination of a discharge valve, an expansible vessel within the car for controlling said valve, and a supply of volatile liquid carried outside the car and exposed to the temperature of the outside air and to that of the discharge from the system, and in communication with said expansible vessel.

In witness whereof, I have hereunto signed my name in the presence of two subscribing witnesses.

EDWARD E. GOLD.

Witnesses:
  DOMINGO A. USINA,
  FRED WHITE.